2,985,899
Patented May 30, 1961

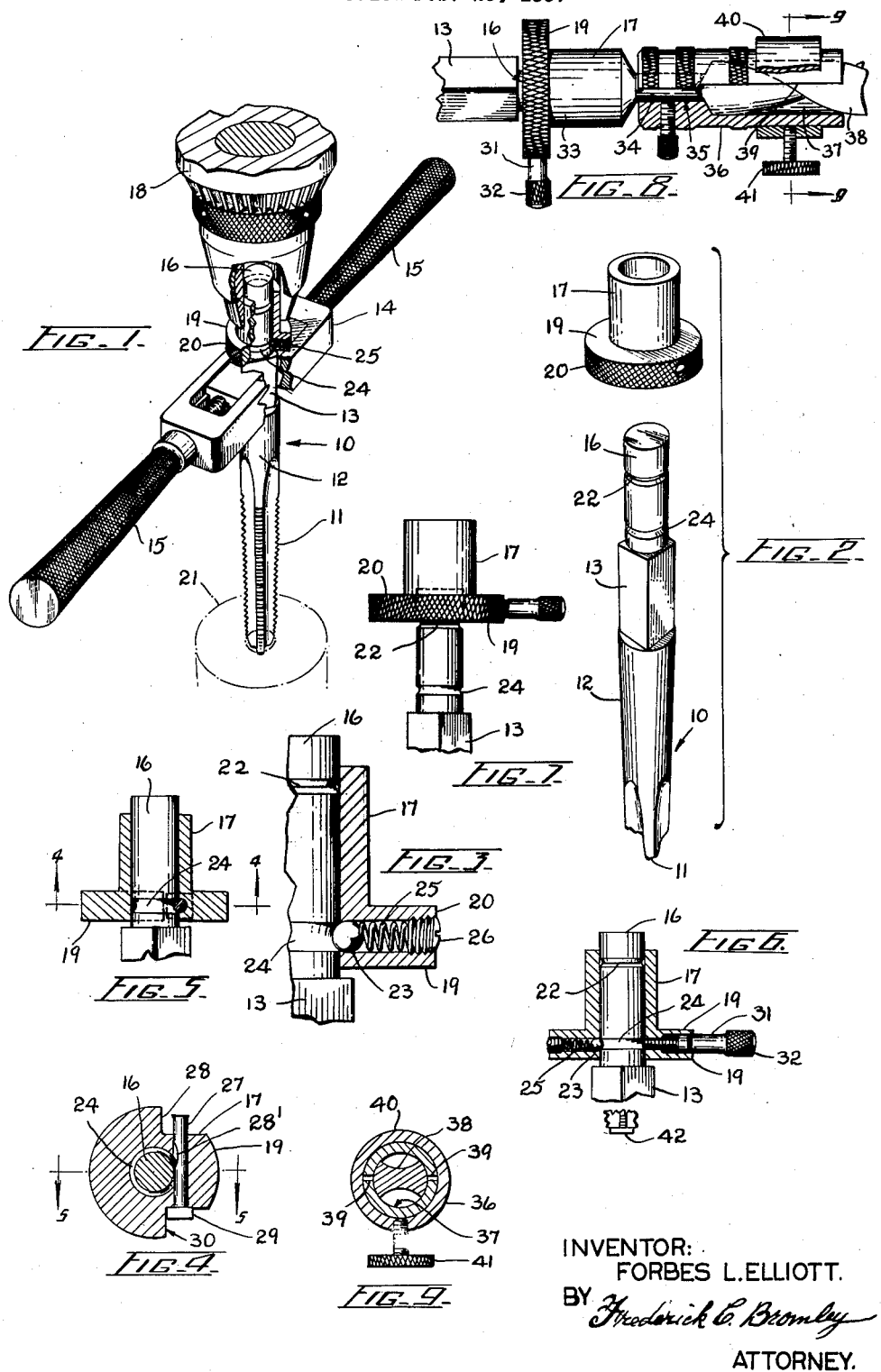

2,985,899

MODIFIED TAP SHANK AND ADAPTER FOR HOLDING THE TAP IN A CHUCK

Forbes L. Elliott, 17 Ash Crescent, Long Branch, Ontario, Canada

Filed Feb. 25, 1957, Ser. No. 642,019

2 Claims. (Cl. 10—147)

My invention relates to tapping devices of the kind principally used for threading a drilled hole manually.

The aim of my invention is to provide a novel tapping device which will facilitate and expedite a tapping operation and one which can be used to advantage by toolmakers and machinists to provide a tapped hole which is truly accurate with regard to alignment. The device of my invention provides for precision with regard to tap alignment and obviates the necessity of the operator going through the usual procedure of bending down to eye up the tap for alignment in starting it in the work and checking sides of the tap with a square to assure that it is at right angles to the face of the work containing the drilled hole to be threaded. If such a check up is not made with a conventional tap then it may be found that the threading operation has not been accurately carried out and that the threads are askew with regard to the axis of the hole.

Another object of my invention is to provide a tapping device comprising an ordinary tap fitted with a special device beyond the wrench receiving section by which the tap may be held true in a chuck or a lathe or drill press and thus guidably supported while it is being turned by a customary wrench to enter the hole in the workpiece. The special device which characterizes the invention is in the form of a guide holder having a central bore by which it is sleeved on a spigot integrally formed on the tap to extend outwardly therefrom beyond the flats that form the usual square section for the wrench. The guide holder can be easily gripped by a standard chuck and thus assures of accurate alignment and at the same time allows the tap to feed into the workpiece in the cutting of the threads while the workpiece is held in the ordinary way.

A still further object of the invention is to provide a tapping device of the kind referred to in which the guide holder is retained on the spigot of the tap at its specified location in the assembly and is capable of being released to accommodate the feed of the tap in a threading operation, while the guide holder is supported as by a chuck in a stationary manner.

A still further aim of the invention is to provide the guide holder with means by which it may be locked to the spigot of the tap so that the tapping device can be held in the chuck of a drill press without the tap dropping out of the guide holder due to its own weight.

With these and other objects in view the invention consists in the novel combination and arrangement of parts as described in the ensuing specification and shown in the accompanying drawing forming a part thereof.

In the drawing:

Figure 1 is a perspective view of the tapping device supplied with a wrench and held in a chuck for tapping a hole in a workpiece;

Figure 2 is a perspective view of the tap and guide holder disassembled;

Figure 3 is a fragmentary view of the upper end of the tap showing the spigot with the assembled guide holder and means for releasably retaining the guide holder in a specified location on the spigot. The guide holder is shown in sections;

Figure 4 is a cross sectional view taken on line 4—4 of Figure 5 and depicting a modified form of the means for releasably securing the guide holder on the spigot;

Figure 5 is a fragmentary view of the tap showing the upper end with the spigot and guide holder retained in assembly by the modified securing means;

Figure 6 is a view similar to Figure 5 but showing a still further way of securing the assembly in a releasable manner;

Figure 7 is a further view of the modification shown in Figure 6, but depicts the spigot in a widthdrawn position and the extent of the withdrawal is indicated by an annular mark on the spigot;

Figure 8 shows a modification in which the guide holder is fitted with a clamped device for attaching it to the end of a twist drill; and Figure 9 is a cross section of this modification taken on the line 9—9 of Figure 8.

In carrying out the invention an ordinary tap is employed which is generally denoted by the reference numeral 10 and comprises the main screw cutting section 11, the shank 12, and the top end section 13 having the usual flats and being square in cross section for receiving a tool by which the tap is turned by hand. A known type of tool is designated as a whole by the numeral 14 in Figure 1, and is of the type having an adjustable jaw element and equipped with diametrical handles 15. This wrench does not per se form a part of the invention and it will be understood that any approved wrench may be employed.

The special device characterizing my invention comprises a spigot 16 extending outwardly of the square section 13 concentric with the axis of the tap and having a cylindrical seating surface of uniform diameter. The spigot is integrally formed on the tap and although the length is not critical it should not be made too short for the reason which will become apparent as the description proceeds.

Assembled on the spigot is a guide holder 17 having a central bore which rotatably and slidably receives the spigot. The guide holder has a circular peripheral surface suited to be held in a conventional chuck such as that indicated at 18 in Figure 1. At the end of the guide holder, adjacent the section 13 of the tap, there is provided a collar 19 which not only facilitates its being handled but also provides an abutment face which limits the extent to which it may be inserted in the jaws of the chuck. The peripheral surface of the collar is desirably knurled or otherwise roughened as indicated at 20 to make it more convenient in handling the guide holder. Since the tapping device may be used on a lathe or drill press, the chuck is simply used as a stationary support for holding the tap in alignment with the work so as to assure that the tap will be accurately aligned at the beginning of the tapping operation. In the mode of use depicted in Figure 1 the chuck holds the tapping device in a vertical attitude such as would be the case when the tapping operation is performed on a drill press. In this view the workpiece is represented at 21 and it will be understood that the same will be fixedly supported in approved manner. In performing a tapping operation the guide holder is held in the chuck and the tap is positioned with its free end adjacent the hole to be threaded. The workman advances the tap to engage the hole by means of the handles 15 of the wrench and goes through the usual motions in working the handles 15 to cause the tap to engage in and start the threading operation which is continued by rotating the tap by hand until the hole is properly threaded whereupon the tap is backed off in the usual way. In the tapping operation the guide holder is held stationary therefore as the tap feeds into the work the spigot withdraws from the guide holder but is firmly supported by the guide holder to assure of true alignment. Once the tap has been properly started in the hole the tapping operation may be continued by power instead of hand operation, this of course is immaterial to the invention.

By holding the tap in proper alignment with the workpiece in the initial threading of the hole there is an important saving in the breakage of taps moreover, a great deal of set up time is eliminated which is an important consideration in shop practice. It is desirable that the workman may know how much of the spigot 16 remains in the guide holder as the tap feeds into the workpiece. I therefore provide an indicating device in the form of an annular mark 22 on the spigot 16 near the distal end thereof which mark may be fashioned by grooving the spigot and filling the groove with a suitable colouring material or the like as is common with indications provided on measuring instruments. Accordingly, as the tap feeds into the work and the spigot withdraws from the guide holder the mark 22 becomes exposed to view at the collar end of the guide holder as depicted in Figure 7 and thus warns the workman that the spigot is almost entirely withdrawn.

The means for retaining the guide holder on the spigot in a specified assembly location must be capable of releasing the guide holder for advancement of the tap in a screw inserting operation. One way of providing such means comprises the position of an annular groove on the cylindrical spigot 16 adjacent to the square section 13 and engaged by a yieldable detent such as a ball 23. The annular groove is indicated at 24 and the ball detent 23 partly enters the same which ball is backed by a spring 25 and fitted together with the spring in a hole provided in the collar 20. A grub screw 26 or the like shoulders the spring in approved manner. According to this arrangement the guide holder is retained in assembly with the tap and in a tapping operation the spigot is capable of withdrawing from the guide holder when the latter is held in a chuck as the tap feeds into the work. The construction is clearly depicted in Figure 3. In Figures 4 and 5 there is a variant form of the means for retaining the guide holder on the spigot in a specified assembly location. In this modification a detent pin 27 is used in co-operation with the groove 24. The detent pin is slidably fitted in a transverse hole in the guide holder and the transverse hole is located in a transverse plane containing said annular groove and intercepting the annular groove. The detent pin is made of sliding fit and is slidable between a locking position and releasing position. In the locking position, shown in Figure 4, the detent pin protrudes into the groove 24. A displaced notch 28' (Figure 4) is provided on the detent pin so that when the pin is shifted endwise to bring this notch into register with the groove 24 the guide holder is released and is free to have relative movement on the spigot. Preferably the guide holder is cut away at diametrically opposite sides to provide recesses 28 at the ends of the transverse hole and the pin is furnished with a head 29 at one end which is positioned against a side face 30 of the respective recess to prevent the detent pin from turning. The other end of the pin is upset or otherwise slightly enlarged to prevent the pin from being completely withdrawn from the transverse hole.

In Figure 6 there is shown a still further variant form of the retaining means. In this variation the guide holder 17 is provided at one side of its diameter with the ball 23 backed by the spring 25 to retain it in the groove 24 and at the other side is provided with a screw 31 threadedly engaged in a radial hole provided in the collar portion 19 and also supplied with an external knurled head 32 by which it may be turned readily. When the screw is fully advanced the inner end seats in the groove and positively locks the tap to the guide holder which is highly desirable when the tapping device is held in a chuck for the reason that the tap cannot drop out of the holder due to its weight. However, when the tap is brought up to the work, screw 31 can be backed off clear of the groove 24 and the ball detent 23 then functions to impositively retain the tap in the holder and to allow it to feed into the work as the tapping operation progresses.

In the variant form of the invention illustrated in Figures 8 and 9 the tap is supplied with the spigot 16 as previously recounted, and this spigot is engaged slidably and rotatably in a guide holder 33 identical to that shown in Figures 6 and 7 with the exception of an axial nipple 34 which is integrally formed thereon to extend outwardly of the rear end thereof. The nipple is fitted in a hole 35 provided in one end of the clamp socket 36. This clamp socket is counter-bored to provide the socket opening 37 open to the other end and of a diameter to provide a slide fit on a standard twist drill indicated at 38 of the prescribed size. The socket opening 37 enables the clamp socket to be fitted on the lower end of the twist drill while the drill is held in a drill press. The counter-bore end of the clamp socket is diametrically split as at 39 and encircled by a clamp ring 40 supplied with a clamping screw 41 which on being tightened clamps the clamp socket on the twist drill. This alternate form of the invention provides a clamping device by which the tap can be supported on a twist drill and therefore after a drilling operation the hole can be tapped without removing the twist drill from the chuck. Actually, of course, the clamping device can be adapted for fitting on a given twist drill and it is not essential that the twist drill be of the size for drilling the hole to be tapped. This arrangement will be found very useful and highly convenient.

As shown in Figure 6 it is preferable that the tap be provided with a pilot element 42 at its forward end for entering the hole to be drilled and thereby steadying the tap and at the same time facilitating the setting up operation. The pilot element is in the form of a slight extension having a diameter which will readily and freely fit in the hole to be drilled.

Having described the invention and the manner of its use it will be understood that various incidental changes and modifications may be resorted to as fairly come within the scope of the appended claims.

What I claim is:

1. A close coupled tapping device comprising a tap having a main screw-cutting section provided with fragmentary threads and connected by a shank part to a head section which is supplied with flats receptive to a wrench, a cylindrical spigot of uniform diameter integrated with said head section and co-axially extending therefrom, a guide holder having a central bore by which it is sleeved on said spigot to rotate freely and free to move endwise on said spigot, said spigot having a peripheral portion which is of circular extent for fitting in a chuck or the like, and means for positively retaining said guide holder on the spigot in a specified assembly location, means for non-positively retaining said guide holder on the spigot in a specified assembly location, said means for non-positively retaining the guide holder in the spigot including a yieldable device being capable of releasing the guide holder for advancement of the tap in a screw threading operation when said positive means has been rendered inactive.

2. A close coupled tapping device comprising a tap having a main screw-cutting section provided with fragmentary threads and connected by a shank part to a head section which is supplied with flats receptive to a wrench, a cylindrical spigot of uniform diameter integrated with said head section and co-axially extending therefrom, a guide holder having a central bore by which it is sleeved on said spigot to rotate freely and to move endwise on said spigot, said spigot having a peripheral portion which is of circular extent for fitting in a chuck or the like, said guide holder having an inner end, an integrated collar surrounding said inner end and having an inner lateral face which determines the extent to which the guide holder may be inserted in a chuck or the like, means for retaining said guide holder on said spigot in a specified assembly relation, said means comprising an annular groove on said spigot, and a spring-pressed detent on the guide holder normally engaged in said groove, said means further comprising a locking screw radially disposed on said collar and having threaded engagement therewith for tightening against said spigot and having an exposed end by which it may be turned.

References Cited in the file of this patent

UNITED STATES PATENTS

| | | |
|---|---|---|
| 458,408 | Schwanhausser | Aug. 25, 1891 |
| 500,292 | Nelson | June 27, 1893 |
| 1,144,425 | Meaker | June 29, 1915 |
| 1,539,439 | Smith | May 26, 1925 |
| 2,383,991 | Sarossy | Sept. 4, 1945 |
| 2,389,548 | Romanoski | Nov. 20, 1945 |
| 2,465,541 | Kreshock | Mar. 29, 1949 |
| 2,529,988 | Zempel | Nov. 14, 1950 |
| 2,642,137 | Vosper | June 16, 1953 |
| 2,643,142 | Stellin | June 23, 1953 |
| 2,793,377 | Ashton | May 28, 1957 |